(12) United States Patent
Saito et al.

(10) Patent No.: US 11,015,065 B2
(45) Date of Patent: May 25, 2021

(54) ANTI-BIOFOULING COATING MATERIAL

(71) Applicant: AGC Inc., Chiyoda-ku (JP)

(72) Inventors: Shun Saito, Chiyoda-ku (JP); Mizuna Toyoda, Chiyoda-ku (JP); Kouji Uchida, Chiyoda-ku (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/282,396

(22) Filed: Feb. 22, 2019

(65) Prior Publication Data
US 2019/0185682 A1 Jun. 20, 2019

Related U.S. Application Data

(63) Continuation of application No. PCT/JP2017/031973, filed on Sep. 5, 2017.

(30) Foreign Application Priority Data

Sep. 6, 2016 (JP) .............................. JP2016-173989

(51) Int. Cl.
| | | |
|---|---|---|
| *C09D 5/16* | (2006.01) | |
| *C09D 127/12* | (2006.01) | |
| *C09D 133/04* | (2006.01) | |
| *C09D 133/14* | (2006.01) | |
| *C09D 5/14* | (2006.01) | |
| *C08F 220/24* | (2006.01) | |
| *C08F 220/36* | (2006.01) | |
| *C09D 5/02* | (2006.01) | |
| *C09D 7/43* | (2018.01) | |
| *C09D 7/63* | (2018.01) | |
| *C09D 133/06* | (2006.01) | |

(52) U.S. Cl.
CPC .......... *C09D 5/1662* (2013.01); *C08F 220/24* (2013.01); *C08F 220/36* (2013.01); *C09D 5/02* (2013.01); *C09D 5/14* (2013.01); *C09D 5/16* (2013.01); *C09D 5/1637* (2013.01); *C09D 127/12* (2013.01); *C09D 133/04* (2013.01); *C09D 133/14* (2013.01); *C09D 7/43* (2018.01); *C09D 7/63* (2018.01); *C09D 133/066* (2013.01)

(58) Field of Classification Search
CPC .... C09D 5/16–5/1693; C09D 127/12–127/20; C09D 133/14; C08L 27/12–27/20; C08L 33/14
See application file for complete search history.

(56) References Cited

U.S. PATENT DOCUMENTS

| | | |
|---|---|---|
| 2010/0145286 A1 | 6/2010 | Zhang et al. |
| 2011/0184116 A1 | 7/2011 | Kimura et al. |
| 2016/0312040 A1 | 10/2016 | Qiu et al. |

FOREIGN PATENT DOCUMENTS

| | | | |
|---|---|---|---|
| CN | 103113796 A | * | 5/2013 |
| EP | 0 811 669 A1 | | 12/1997 |
| EP | 2 660 289 A2 | | 11/2013 |
| JP | 5-302271 | | 11/1993 |
| JP | 9-302328 | | 11/1997 |
| JP | 2003-119419 | | 4/2003 |
| JP | 3868787 B2 | | 1/2007 |
| JP | 2009197070 A | * | 9/2009 |
| JP | 2009-256471 | | 11/2009 |
| JP | 5424575 B2 | | 2/2014 |
| JP | 2015-124349 | | 7/2015 |
| JP | 2016-502581 | | 1/2016 |
| JP | 6289487 B2 | | 3/2018 |
| WO | WO 2007/116912 A1 | | 10/2007 |
| WO | WO 2008/003662 A1 | | 1/2008 |
| WO | WO 2010/041688 A1 | | 4/2010 |
| WO | WO 2010/065960 A2 | | 6/2010 |
| WO | WO 2016/058104 A1 | | 4/2016 |

OTHER PUBLICATIONS

Machine translation of CN 103113796 A (Year: 2013).*
Machine translation of JP 2009-197070 A (Year: 2009).*
International Search Report dated Oct. 24, 2017 in PCT/JP2017/031973 filed Sep. 5, 2017 (with English Translation).

* cited by examiner

*Primary Examiner* — Ramsey Zacharia
(74) *Attorney, Agent, or Firm* — Foley & Lardner LLP

(57) ABSTRACT

The present invention has an object to provide an anti-biofouling coating material which is capable of forming a coating film excellent in anti-biofouling properties and adhesiveness. Further, the present invention has another object to provide a ship, etc. and an article to be used in a humid or wetted environment, having, on its surface, a coating film formed by using the above anti-biofouling coating material. Further, the present invention has other objects to provide a method for preventing adhesion of organisms to a ship, etc. and to provide a method for preventing adhesion of fungi or algae to the surface of an article to be used in a humid or wetted environment, by using the above anti-biofouling coating material. The anti-biofouling coating material of the present invention is an anti-biofouling coating material to be applied to the surface of an article in order to prevent adhesion of organisms, which comprises a polymer F being a fluorinated polymer containing units based on a fluoroolefin, and a polymer G being a polymer containing units based on a (meth)acrylate having a polyoxyalkylene chain.

12 Claims, No Drawings

ANTI-BIOFOULING COATING MATERIAL

TECHNICAL FIELD

The present invention relates to an anti-biofouling coating material, preferably to a marine anti-biofouling coating material to be applied to the surface of a ship, marine structure or subsea structure, and an antifungal antialgal coating material to be applied to the surface of an article.

BACKGROUND ART

In order to impart water repellency to various substrates, a composition comprising a fluorinated polymer is used. As such a fluorinated polymer, for example, a fluorinated polymer comprising units based on a (meth)acrylate having a polyfluoroalkyl group, and units based on a (meth)acrylate having an amino group-containing hydrocarbon group, has been disclosed (see Patent Document 1).

PRIOR ART DOCUMENTS

Patent Documents

Patent Document 1: JP-A-H05-302271

DISCLOSURE OF INVENTION

Technical Problem

In recent years, in order to suppress staining or degradation of a coating film due to adhesion of organisms to the coating film, development of coating materials (hereinafter referred to also as anti-biofouling coating materials) capable of preventing or suppressing adhesion of organisms has been in progress. Specifically, the anti-biofouling coating materials may, for example, be marine anti-biofouling coating materials to prevent or suppress adhesion of sessile organisms such as shellfish to sea or subsea marine structures or to the bottoms of ships, and antifungal antialgal coating materials to prevent or suppress adhesion of fungi or algae to outdoor buildings in high temperature humid areas or to members to be used for water supply.

The present inventors have prepared a coating film on a substrate by using the coating material containing a fluorinated polymer as disclosed in the above Patent Document 1, as an anti-biofouling coating material, and, as a result, have found that it is not only impossible to sufficiently suppress adhesion of organisms, but also the adhesiveness of the coating film to the substrate is insufficient.

Therefore, the present invention has an object to provide an anti-biofouling coating material which is capable of forming a coating film excellent in anti-biofouling properties and adhesiveness. Further, the present invention has another object to provide a ship, marine structure or subsea structure and an article to be used in a humid or wetted environment, having, on its surface, a coating film formed by using the above anti-biofouling coating material. Further, the present invention has other objects to provide a method for preventing adhesion of sessile organisms to a ship, marine structure or subsea structure and to provide a method for preventing adhesion of fungi or algae to the surface of an article to be used in a humid or wetted environment, by using the above anti-biofouling coating material.

Solution to Problems

The present inventors have intensively studied the above problems, and, as a result, have found it possible to obtain the desired effects by using a fluorinated polymer containing units based on a fluoroolefin and a polymer containing units based on a (meth)acrylate having a hydrophilic polyoxyalkylene chain, in combination, and thus have arrived at the present invention.

That is, the present inventors have found it possible to solve the above problems by the following constructions.

[1] An anti-biofouling coating material to be applied to the surface of an article to prevent adhesion of organisms, which comprises a polymer F being a fluorinated polymer containing units based on a fluoroolefin, and a polymer G being a polymer containing units based on a (meth)acrylate having a hydrophilic polyoxyalkylene chain.

[2] The anti-biofouling coating material according to [1], wherein the polymer F further contains units based on a monomer having a hydrophilic polyoxyalkylene chain.

[3] The anti-biofouling coating material according to [1] or [2], wherein the polymer G further contains units based on a (meth)acrylate or α-haloacrylate having a polyfluoroalkyl group.

[4] The anti-biofouling coating material according to any one of [1] to [3], wherein the polymer G further contains units based on a (meth)acrylate having a group represented by the formula —$NR^1R^2$ or formula —$N(O)R^3R^4$ (wherein $R^1$, $R^2$, $R^3$ and $R^4$ are each independently a benzyl group, a $C_{1-8}$ alkyl group or a $C_{2-3}$ hydroxyalkyl group) or units based on a (meth)acrylamide.

[5] The anti-biofouling coating material according to any one of [1] to [4], wherein the polymer G further contains units based on a hydroxyalkyl (meth)acrylate having a $C_{1-12}$ hydroxyalkyl group.

[6] The anti-biofouling coating material according to any one of [1] to [5], which further contains water, and wherein the polymer F and the polymer G are, respectively, dispersed in the form of particles.

[7] The anti-biofouling coating material according to any one of [1] to [6], wherein to the total mass of the polymer F and the polymer G, the content of the polymer F is from 50 to 99 mass %.

[8] The anti-biofouling coating material according to any one of [1] to [7], which is a marine anti-biofouling coating material to be applied to the surface of a ship, marine structure or subsea structure, to prevent adhesion of marine organisms.

[9] A ship, marine structure or subsea structure having, on its surface, a coating film formed by using the anti-biofouling coating material as defined in any one of [1] to [8].

[10] A method for preventing adhesion of organisms on the surface of a ship, marine structure or subsea structure, which comprises forming a coating film of the anti-biofouling coating material as defined in any one of [1] to [8], on the surface of the ship, marine structure or subsea structure.

[11] The anti-biofouling coating material according to any one of [1] to [7], which is a coating material to be applied to the surface of an article to be used in a humid environment or wetted environment, to prevent adhesion of fungi or algae.

[12] The anti-biofouling coating material according to [11], which further contains a fungicide or anti-algae agent.

[13] An article to be used in a humid environment or wetted environment, which has, on its surface, a coating film formed by using the anti-biofouling coating material as defined in [11] or [12].

[14] A method for preventing adhesion of fungi or algae to an article to be used in a humid environment or wetted environment, which comprises forming a coating film of the anti-biofouling coating material as defined in any one of [1] to [7], on the surface of the article.

Advantageous Effects of Invention

According to the present invention, it is possible to provide an anti-biofouling coating material capable of forming a coating film excellent in anti-biofouling properties and adhesiveness. In particular, according to the present invention, it is possible to provide an anti-biofouling coating material, whereby at the time of immersion in sea for 4 months, the adhesion rate of sessile organisms against the above coating film is at most 20% of the coating film surface, and the adhesion rate of fungi and algae is at most 10% of the coating film surface.

Further, according to the present invention, it is possible to provide a ship, marine structure or subsea structure and an article to be used under a humid or wetted environment, having, on its surface, a coating film formed by using the above anti-biofouling coating material. Further, according to the present invention, it is possible to provide a method for preventing adhesion of sessile organisms to a ship, marine structure or subsea structure, and a method for preventing adhesion of fungi or algae on the surface of an article to be used in a humid environment or wetted environment.

DESCRIPTION OF EMBODIMENTS

Meanings of terms in the present invention are as follows.

A "unit" is a generic term for a group of atoms formed directly by polymerization of a monomer and an atomic group obtainable by chemically converting a part of said group of atoms. The contents (mol %) of the respective units to all units which a polymer contains, are obtainable by analyzing the polymer by a nuclear magnetic resonance spectroscopy method.

The "number average molecular weight" and "weight average molecular weight" are values to be measured by gel permeation chromatography using polystyrene as a standard substance. The number average molecular weight may also be referred to as "Mn", and the weight average molecular weight may also be referred to as "Mw".

An "average particle size" is a value of D50 to be obtained by a dynamic light scattering method using ELS-8000 (manufactured by Otsuka Electronics Co., Ltd.). D50 represents a particle diameter at the volume cumulative 50 vol % calculated from the small particle side in the particle size distribution of particles as measured by a dynamic light scattering method.

A "(meth)acrylate" is a generic term for an "acrylate" and a "methacrylate"; "(meth)acryl" is a generic term for "acryl" and "methacryl"; and "(meth)acryloyl" is a generic term for "acryloyl" and "methacryloyl". Further, a (meth)acryloyl group in a (meth)acrylic acid derivative is represented by the formula $CH_2=CR-C(=O)-$, and a (meth)acryloyloxy group is represented by the formula $CH_2=CR-C(=O)O-$. Here, R is a hydrogen atom or a methyl group. Further, an α-haloacryloyloxy group is the above group wherein said R is substituted by a halogen atom.

The anti-biofouling coating material of the present invention (hereinafter referred to also as the "coating material of the present invention") is characterized by comprising a polymer F being a fluorinated polymer containing units based on a fluoroolefin, and a polymer G being a polymer containing units based on a (meth)acrylate having a hydrophilic polyoxyalkylene chain.

The present inventors have found that the polymer G having a hydrophilic polyoxyalkylene chain in the side chain, has such an effect that biopolymers such as proteins or cells are less likely to be adsorbed or adhered, and further, such an effect that organisms are less likely to be fixed. And, they have found that the above effects are remarkably developed by an interaction with the polymer F in the present invention.

The reason for this is not necessarily clear, but it is considered as follows.

It is considered that sessile organisms to stick to a solid surface in water or in a wetted environment would regard an adhesion object to be a solid, and when they judge it to be a preferred habitat, they will attach and stick to the adhesion object. In the coating film formed from the coating material of the present invention (hereinafter referred to also as "the present coating film"), the polymer G is considered to be stably present while maintaining a constant distance to the polymer F having a high hydrophobicity. Thus, the hydrophilic polyoxyalkylene chain of the polymer G is oriented to the surface of the coating film, and by the interaction of the hydrophilic polyoxyalkylene chain and water, at least a portion of the coating film surface is considered to be hydrated and swollen. Therefore, it is considered that sessile organisms would regard the present coating film to be water rather than a solid and would not adhere to this coating film. In other words, the present coating film exhibits an anti-biofouling mechanism (hereinafter referred to also as the first working mechanism) not depending upon an anti-biofouling component, being separate from a repellent against sessile organisms, or from the main constituents (polymers) of the coating material. Therefore, the present coating film has the first working mechanism excellent over a long period of time.

Thus, the coating material of the present invention is suitably used as an anti-biofouling coating material to be applied to the surface of a ship, marine structure or subsea structure in order to prevent adhesion of sessile organisms in water or in a wetted environment. As the sessile organisms in water or in a wetted environment may, for example, be Cirripedia such as barnacles, etc., shellfish such as Mytilus galloprovincialis, oyster, etc., ascidians, bryozoans, etc.

Further, in general, the surface of a coating film formed by using a coating material containing a fluorinated polymer tends to easily repel water and thus has excellent physical properties such as weather resistance, but on the other hand, water once absorbed tends to be accumulated in the coating film. Further, water on the surface of the coating film tends to flow through the same path. That is, the surface of the coating film may, when viewed in part, sometimes form an atmosphere where water or moisture is likely to be pooled and thus may form an environment where fungi or algae are likely to propagate.

With respect to such a problem, the present inventors have found that the coating film to be formed from the coating material of the present invention itself forms an environment unsuitable for propagation of fungi or algae, and the coating material of the present invention thus has an antifungal and antialgal mechanism (hereinafter referred to also as "the second working mechanism") not depending on an anti-bactericidal action of an antifungal agent (preservative) or antialgae agent. Therefore, the coating film to be formed from the coating material of the present invention has a low environmental load and is capable of exhibiting the second working mechanism over a long period of time.

The reason for this is considered to be such that the polymer G having such an effect that biopolymers such as proteins or cells are less likely to be adsorbed or adhered, is oriented to the coating film surface by an interaction with the polymer F as described above, and the present coating film thus forms an environment where a breeding nutrient source for fungi or algae is less likely to be adhered. Further, it is also considered to be such that the coating film comprising the polymer F and the polymer G has high water resistance (low water vapor permeability) and air shielding property (low oxygen permeability), and thus, forms such an environment that is not suitable for propagation of fungi or algae. Therefore, the present coating film exhibits the second working mechanism over a long period of time even in an environment where fungi and algae are likely to propagate, such as in a humid environment or wetted environment.

Thus, the coating material of the present invention is suitably used as a coating material to be applied to the surface of an article to be used in a humid environment or wetted environment, in order to prevent adhesion of fungi or algae.

In this specification, the first working mechanism and the second working mechanism may collectively be referred to simply as "the working mechanisms of the present invention".

Further, since the coating material of the present invention contains a polymer F, it is also excellent in adhesiveness to an article as a coating object of the coating material. Therefore, the present coating film has excellent water resistance (in particular salt water resistance) and weatherability durable against an environmental change (atmospheric exposure, temperature changes, etc.).

Thus, by the synergistic effect of the polymer F and the polymer G contained in the coating material of the present invention, the working mechanisms of the present invention are remarkably expressed.

Hereinafter, the polymer F in the present invention will be described in detail.

Here, a fluoroolefin is meant for an olefin having one or more hydrogen atoms substituted by fluorine atoms. The fluoroolefin may have one or more hydrogen atoms not substituted by fluorine atoms, substituted by chlorine atoms.

The polymer F contains units based on a fluoroolefin (hereinafter referred to also as "units F1"). The polymer F may contain two or more types of units F1.

As the fluoroolefin, $CF_2=CF_2$, $CF_2=CFCl$, $CF_2=CHF$ and $CF_2=CH_2$ are preferred, and from the viewpoint of alternating copolymerizability with other monomers, $CF_2=CF_2$ and $CF_2=CFCl$ are more preferred, and $CF_2=CFCl$ is particularly preferred.

The content of units F is, to all units contained in the polymer F, preferably from 20 to 70 mol %, more preferably from 30 to 70 mol %, particularly preferably from 40 to 60 mol %. When the content of units F1 is at least 20 mol %, the water resistance (particularly salt water resistance) and weather resistance of the coating film will be more excellent.

The polymer F preferably further contains units based on a monomer having a hydrophilic polyoxyalkylene chain (hereinafter referred to also as "units F2"). By a synergistic action of the polyoxyalkylene chain in units F2 and the polymer G, the working mechanisms of the present invention will be more effectively expressed. Further, the compatibility of the polymer F and the polymer G in the coating material of the present invention will be improved, so that the adhesiveness of the coating film will be further improved.

Units F2 are preferably units based on a monomer represented by the formula (1) (hereinafter referred to also as a "monomer F2").

$$X—Y—(OC_mH_{2m})_n—Z \qquad \text{Formula (1):}$$

wherein X is a polymerizable group, Y is a divalent linking group, $(OC_mH_{2m})_n$ is a polyoxyalkylene chain, Z is a monovalent terminal group, m is an integer of from 2 to 4, and n is an integer of at least 6.

The above hydrophilic polyoxyalkylene chain is meant for a polyoxyalkylene chain wherein in a polyoxyalkylene chain represented by the formula $—(OC_mH_{2m})_n—$, at least a portion is an oxyethylene group.

From such a viewpoint that the working mechanisms of the present invention will be more excellent, n is preferably at least 12, more preferably at least 15. The upper limit is preferably 40, more preferably 20.

As the oxyalkylene group represented by $—(OC_mH_{2m})—$, an oxyethylene group and an oxypropylene group are preferred.

In a case where $—(OC_mH_{2m})_n—$ has a plurality of oxyalkylene groups different in m, their linking order is not particularly limited and may be a random type or a block type.

Oxyalkylene groups in the polyoxyalkylene chain will be formed by ring-opening addition polymerization of cyclic ethers such as ethylene oxide, propylene oxide, tetrahydrofuran, etc. Usually, by using a hydroxy group-containing compound such as a monool or diol as the initiator, and by ring-opening addition polymerizing a cyclic ether to this initiator, a monool or diol having a polyoxyalkylene chain will be produced. The above monomer F2 is produced by introducing a polymerizable group into this monool or diol. Otherwise, it is also possible to produce the monomer F2 by ring-opening polymerizing a cyclic ether to a monool or diol having a polymerizable group.

As the hydrophilic polyoxyalkylene chain, preferred is a polyoxyethylene chain consisting solely of oxyethylene groups, or a polyoxyalkylene group having oxyethylene groups and $C_{3\ or\ 4}$ oxyalkylene groups, wherein the proportion of oxyethylene groups is preferably at least 50 mol % to the total of both. In the latter case, preferred is a polyoxyalkylene group having oxyethylene groups and oxypropylene groups, wherein the proportion of oxyethylene groups is preferably at least 70 mol % to the total of both. A particularly preferred hydrophilic polyoxyalkylene chain is a polyoxyethylene chain consisting solely of oxyethylene groups.

X is preferably a polymerizable unsaturated group to form the main chain of the polymer F. As X, $CH_2=CH—$, $CH_2=CHCH_2—$, $CH_3CH=CH—$, $CH_2=C(CH_3)—$, $CH_2=CHC(O)O—$, $CH_2=C(CH_3)C(O)O—$, $CH_2=CHO—$ and $CH_2=CHCH_2O—$ are preferred, and from the viewpoint of alternating copolymerizability with a fluoroolefin, $CH_2=CHO—$ and $CH_2=CHCH_2O—$ are more preferred.

Y is preferably a divalent hydrocarbon group having from 1 to 20 carbon atoms, more preferably a divalent saturated hydrocarbon group having from 1 to 20 carbon atoms. The divalent linking group may be a straight-chain group, a branched group or a group containing a cyclic structure, and is preferably a group containing a cyclic structure with a view to letting the polyoxyalkylene chain be oriented to the surface in the coating film and letting the working mechanisms of the present invention be especially effectively expressed.

As Z, a hydroxy group, a $C_{1-20}$ alkoxy group and a phenoxy group are preferred; a hydroxy group, a methoxy group and an ethoxy group are more preferred; and from the viewpoint of excellent working mechanisms of the present invention, a hydroxy group is particularly preferred.

As specific examples of the monomer F2, compounds represented by the following formulae may be mentioned.

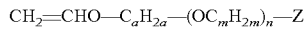
$CH_2=CHO-C_aH_{2a}-(OC_mH_{2m})_n-Z$

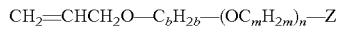
$CH_2=CHCH_2O-C_bH_{2b}-(OC_mH_{2m})_n-Z$

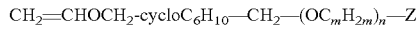
$CH_2=CHOCH_2-cycloC_6H_{10}-CH_2-(OC_mH_{2m})_n-Z$

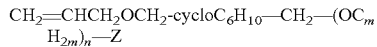
$CH_2=CHCH_2OCH_2-cycloC_6H_{10}-CH_2-(OC_mH_{2m})_n-Z$

In the respective formulae, a is an integer of from 1 to 10, and b is an integer of from 1 to 10. The definitions of m, n and Z are as described above. Further, $-cycloC_6H_{10}-$ represents a cyclohexylene group, and the linking sites of ($-cycloC_6H_{10}-$) may be 1,4-, 1,3- or 1,2- and are usually 1,4-.

Further, as the monomer F2, two or more types may be used in combination.

The content of units F2 is, to all units contained in the polymer F, preferably at least 0.4 mol %, and from a viewpoint of excellent working mechanisms of the present invention, more preferably at least 1.5 mol %, particularly preferably at least 2.0 mol %. The upper limit is preferably 15 mol %, more preferably 10 mol %.

According to a study by the present inventors, a polymer F containing units wherein a terminal of a hydrophilic polyoxyalkylene chain is a hydroxy group (e.g. units based on a monomer F2 wherein Z is a hydroxy group), was excellent in the working mechanisms of the present invention even when their content was small, by the interaction of the hydrophilic polyoxyalkylene chain and hydroxy group with water. Further, if their content is small, it is possible to increase the content of units based on the above-described fluoroolefin, whereby it becomes possible to prepare a polymer F to form a coating film more excellent in water resistance (particularly salt water resistance) and weather resistance.

The polymer F may contain units other than units F1 and units F2. As such units, units (hereinafter referred to also as "units F3") based on a monomer (hereinafter referred to also as a "monomer F3") having a cyclic hydrocarbon group, or units (hereinafter referred to also as "units F4") based on a monomer (hereinafter referred to also as "monomer F4") having a crosslinkable group, may be mentioned.

A unit having a hydrophilic polyoxyalkylene chain and a hydroxy group belongs to the above-described unit F2 and does not belong to the "unit based on a monomer having a crosslinkable group". The unit F2 may form a crosslinked structure by reacting with a reactive group of e.g. a cross-linking agent. Further, a unit having a cyclic hydrocarbon group and a hydrophilic polyoxyalkylene chain shall belong to the unit F2, and a unit having a cyclic hydrocarbon group and a crosslinkable group shall belong to the unit F4.

The cyclic hydrocarbon group of the monomer F3 may be a hydrocarbon group having at least one cyclic structure. The number of carbon atoms in the cyclic hydrocarbon group is, from the viewpoint of polymerization reactivity, preferably from 4 to 20, more preferably from 5 to 10.

Specific examples of the cyclic hydrocarbon group may be a monocyclic saturated hydrocarbon group such as a cyclobutyl group, a cycloheptyl group, a cyclohexyl group, etc., a bi-cyclic saturated hydrocarbon group such as 4-cyclohexylcyclohexyl group, etc., a polycyclic saturated hydrocarbon group such as a 1-decahydronaphthyl group, a 2-decahydronaphtyl group, etc., a cross-linked cyclic saturated hydrocarbon group such as a 1-norbornyl group, a 1-adamantyl group, etc., a spiro hydrocarbon group such as a spiro[3.4]octyl group, etc.

A specific example of the monomer F3 may be a vinyl ether, an allyl ether, an alkyl vinyl ester, an alkyl allyl ester or a (meth)acrylate being a monomer having a cyclic hydrocarbon group, and is more specifically a cycloalkyl vinyl ether (e.g. cyclohexyl vinyl ether).

Here, as the monomer F3, two or more types may be used in combination.

In a case where the polymer F contains units F3, the water resistance of the coating film will be improved.

In a case where the polymer F contains units F3, the content of units F3 is, from such a viewpoint that the working mechanisms of the present invention will be more excellent, preferably from 0.1 to 45 mol %, more preferably from 1 to 40 mol %, further preferably from 3 to 35 mol %, particularly preferably from 5 to 30 mol %, to all units contained in the polymer F.

The crosslinkable group of the monomer F4 is preferably a functional group having active hydrogen (such as a hydroxy group, a carboxy group, an amino group, etc.) or a hydrolyzable silyl group (such as an alkoxysilyl group). In a case where the polymer F has a crosslinkable group, by incorporating a corresponding cross-linking agent to the coating material of the present invention, curing of the present coating film becomes possible, whereby it becomes easier to adjust the coating film properties (such as the anti-biofouling properties, weather resistance, water resistance (particularly salt water resistance), adhesiveness, etc.).

Specific examples of the monomer F4 may be a hydroxyalkyl vinyl ether, a hydroxyalkyl cycloalkyl vinyl ether, a hydroxyalkyl vinyl ester, a hydroxyalkyl cycloalkyl vinyl ester, a hydroxyalkyl allyl ether, a hydroxyalkyl allyl ester, a hydroxyalkyl ester of acrylic acid, and a hydroxyalkyl ester of methacrylic acid, and may more specifically be 2-hydroxyethyl vinyl ether, 4-hydroxymethyl cyclohexyl vinyl ether, 4-hydroxybutyl vinyl ether, cyclohexanedimethanol monovinyl ether, hydroxyethyl allyl ether, hydroxyethyl acrylate, and hydroxyethyl methacrylate.

Here, as the monomer F4, two or more types may be used in combination.

The content of units F4 is, from such a viewpoint that the coating film will be excellent in the above-mentioned coating film properties, preferably from 0 to 20 mol %, more preferably from 0 to 18 mol %, particularly preferably from 0 to 15 mol %, to all units contained in the polymer F.

The polymer F may further contain units other than units F1, units F2, units F3, and units F4. Such units may be units (hereinafter referred to also as "units F5") based on a monomer (hereinafter referred to also as a "monomer F5") not having a hydrophilic polyoxyalkylene chain, a fluorine atom, a cyclic hydrocarbon group and a crosslinkable group.

A specific example of the monomer F5 may be a vinyl ether, an allyl ether, an alkyl vinyl ester, an alkyl allyl ester, an olefin or a (meth)acrylate, being a monomer not having a hydrophilic polyoxyalkylene chain, a fluorine atom, a cyclic hydrocarbon group and a crosslinkable group. More specifically, an alkyl vinyl ether (such as nonyl vinyl ether, 2-ethylhexyl vinyl ether, hexyl vinyl ether, ethyl vinyl ether, n-butyl vinyl ether or tert-butyl vinyl ether), an alkyl allyl ether (such as ethyl allyl ether or hexyl allyl ether), a vinyl ester of a carboxylic acid (such as acetic acid, butyric acid, pivalic acid, benzoic acid or propionic acid), an allyl ester of a carboxylic acid (such as acetic acid, butyric acid, pivalic acid, benzoic acid or propionic acid), ethylene, propylene, or isobutylene may be mentioned. Further, the monomer F5 may contain a polyoxyalkylene chain (e.g. a polyoxyalkylene chain not containing an oxyethylene group as the oxyalkylene group) other than a hydrophilic polyoxyalkylene chain.

As the monomer F5, two or more types may be used in combination.

The content of units F5 is preferably from 0 to 50 mol %, more preferably from 5 to 45 mol %, particularly preferably from 15 to 40 mol %, to all units contained in the polymer F.

The polymer F is preferably such that to all units contained in the polymer F, the contents of units F1, units F2, units F3, units F4 and units F5 are from 20 to 70 mol %, from 0.4 to 15 mol %, from 0 to 45 mol %, from 0 to 20 mol % and from 0 to 50 mol %, respectively, in this order.

The fluorine content in the polymer F is preferably from 10 to 70 mass %, particularly preferably from 20 to 50 mass %.

Mn of the polymer F is preferably from 30,000 to 200,000, more preferably from 50,000 to 180,000.

In the coating material of the present invention, the polymer F may be in a state of a powder (solid), may be in a state of a solution dissolved in an organic solvent, or may be in a state of a dispersion (aqueous dispersion) dispersed in the form of particles in water, and from the viewpoint of the following film properties, it is preferably in a state of an aqueous dispersion.

In such a case, the average particle size of particles of the polymer F in the aqueous dispersion is preferably at most 100 nm. The present inventors have found that in such a case, the water resistance of a coating film formed from the coating material of the present invention is more excellent. The reason is not necessarily clear, but it is considered that in the coating film, particles of the polymer F are densely packed, whereby occurrence of pinholes in the coating film is suppressed, and as a result, the water resistance of the coating film is improved.

The average particle size of particles of the polymer F is preferably at most 90 nm, more preferably at most 80 nm, particularly preferably at most 70 nm, from the viewpoint of the water resistance of the coating film. The lower limit is usually 50 nm.

Next, the polymer G contained in the coating material of the present invention will be described in detail.

The polymer G contains units (hereinafter referred to also as "units G1") based on a (meth)acrylate (hereinafter referred to also as a "monomer G1") having a hydrophilic polyoxyalkylene chain. Here, the polymer G does not include units based on a fluoroolefin (i.e. the above-mentioned units F1).

As the monomer G1, a compound represented by the formula $CH_2=CR-C(=O)O-C_pH_{2p}O)_q-R^5$ is preferred.

In the formula, $R^5$ is a hydrogen atom, a $C_{1-8}$ alkyl group, a (meth)acryloyl group or a glycidyl group, p is an integer of from 2 to 4, and q is an integer of from 2 to 30.

As R, a methyl group is preferred.

As $R^5$, a hydrogen atom, a methyl group, an ethyl group and a (meth)acryloyl group are preferred, and a hydrogen atom and a (meth)acryloyl group are particularly preferred.

The above hydrophilic polyoxyalkylene chain is meant for such a polyoxyalkylene chain that in a polyoxyalkylene chain represented by the formula $-(C_pH_{2p}O)_q-$, at least some of oxyalkylene groups are oxyethylene groups.

q is preferably from 2 to 20. When q is in the above range, compatibility of the polymer F and the polymer G will be good, and the adhesiveness of the coating film will be excellent.

As the oxyalkylene group represented by $-(C_pH_{2p}O)-$, an oxyethylene group and an oxypropylene group are preferred.

In a case where $-(C_pH_{2p}O)_q-$ has plural types of oxyalkylene groups different in q, their linking order is not particularly limited, and may be a random type or a block type.

Oxyalkylene groups in the polyoxyalkylene chain will be formed by ring-opening addition polymerization of cyclic ethers such as ethylene oxide, propylene oxide, 1,2-butylene oxide and tetrahydrofuran. Usually, by using a hydroxy group-containing compound such as a monool or diol as an initiator, and by letting a cyclic ether undergo ring-opening addition polymerization with this initiator, a monool or diol having a polyoxyalkylene chain is produced. The above monomer G1 is produced by introducing a polymerizable group into this monool or diol. It is also possible to produce the monomer G1 by ring-opening polymerizing a cyclic ether to a monool having a polymerizable group.

The hydrophilic polyoxyalkylene chain is preferably a polyoxyethylene chain consisting solely of oxyethylene groups, or a polyoxyalkylene chain having oxyethylene groups and $C_3$ or $C_4$ oxyalkylene groups wherein the proportion of oxyethylene groups to the total of both is at least 50 mol %. In the latter case, preferred is a polyoxyalkylene chain having oxyethylene groups and oxypropylene groups wherein the proportion of oxyethylene groups to the total of both is at least 70 mol %. A particularly preferred hydrophilic polyoxyalkylene chain is a polyoxyethylene chain consisting solely of oxyethylene groups.

When $R^5$ is a hydrogen atom or a glycidyl group, unit G1 will have a hydroxy group or a glycidyl group, and the polymer G will have such reactive groups. Further, when $R^5$ is a (meth)acryloyl group, the monomer G1 becomes a bifunctional monomer, and usually, the obtainable polymer G will be a crosslinked polymer.

As the monomer G1, two or more types may be used in combination. That is, as the monomer G1, two or more types different in values of p and/or q in $-(C_pH_{2p}O)_q-$ may be used in combination. For example, two or more types of the monomer G1 having polyoxyalkylene chains different in proportion of oxyethylene units may be used in combination. Further, two or more types different in $R^5$ may be used in combination. For example, a monomer G1 which is a mono(meth)acrylate and a monomer G1 which is a di(meth)acrylate, may be used in combination.

The monomer G1 may be produced by e.g. a method of (meth)acrylating at least one of the two hydroxy groups of a polyethyleneglycol, a method of (meth)acrylating an alkanol/ethylene oxide adduct obtainable by ring-opening addition of ethylene oxide to an alkanol initiator, a method of ring-opening addition of ethylene oxide by using a hydroxyalkyl (meth)acrylate as the initiator, or a method of (meth)acrylating at least one of the two hydroxy groups of an alkanediol/ethylene oxide adduct obtainable by ring-opening addition of ethylene oxide to an alkane diol initiator. Further, at the time of the above ring-opening addition, by a method of letting a mixture of ethylene oxide and other epoxide undergo ring-opening polymerization, or by a method of letting ethylene oxide and other epoxide undergo ring-opening addition separately and sequentially, it is possible to produce a monomer G1 having a polyoxyalkylene chain having oxyethylene groups and other oxyalkylene groups.

Further, a monomer G1 wherein $R^5$ has a glycidyl group, may be produced, for example, by converting a hydroxy group remaining after the (meth)acrylation to a glycidyl group.

As the monomer G1, the following compounds may be mentioned. Among the following compounds, in a compound having a polyoxyalkylene chain having oxyethylene groups and other oxyalkylene groups, the proportion of oxyethylene groups to all oxyalkylene groups in the polyoxyalkylene chain is at least 50 mol %.

A mono(meth)acrylate of polyethylene glycol

A (meth)acrylate of polyethylene glycol monomethyl ether

A (meth)acrylate of polyethylene glycol monoethyl ether

A (meth)acrylate of ethanol/ethylene oxide adduct

A (meth)acrylate of methanol/(ethylene oxide-propylene oxide mixture) adduct

A (meth)acrylate of ethanol/(ethylene oxide-propylene oxide mixture) adduct

A mono(meth)acrylate of ethylene glycol/(ethylene oxide-propylene oxide mixture) adduct A di(meth)acrylate of ethylene glycol/(ethylene oxide-propylene oxide mixture) adduct A (meth)acrylate of ethanol/(ethylene oxide-propylene oxide sequential adduct)

Further, as a monomer G6 as described below, a monomer having a non-hydrophilic polyoxyalkylene chain may be mentioned. As the monomer G6, mono(meth)acrylates and di(meth)acrylates represented by the above formulae except that p or q in —$(C_pH_{2p}O)_q$— is different, may be mentioned. The non-hydrophilic polyoxyalkylene chain may, for example, be a polyoxypropylene chain, a poly(oxy-1,2-butylene) chain or a polyoxytetramethylene chain. Further, a poly(oxypropylene-oxyethylene) chain wherein the content proportion of oxyethylene groups is low (the content proportion of oxyethylene groups among oxyalkylene groups is less than 50 mol %) is also a non-hydrophilic polyoxyalkylene chain.

As the monomer having a non-hydrophilic polyoxyalkylene chain, the following compounds may be mentioned.

A mono(meth)acrylate of polypropylene glycol

A di(meth)acrylate of polypropylene glycol

A (meth)acrylate of polypropylene glycol monoethyl ether

A mono(meth)acrylate of polyoxytetramethylene glycol

A (meth)acrylate of ethanol/(propylene oxide-1,2-butylene oxide mixture) adduct

The content of units G1 in the polymer G is, from such a viewpoint that the working mechanisms of the present invention will be more excellent, preferably from 0.5 to 50 mol %, more preferably from 5 to 50 mol %, particularly preferably from 10 to 40 mol %, to all units contained in the polymer G.

From the viewpoint of compatibility with the polymer F and anti-fouling properties of the coating film, the polymer G preferably contains units (hereinafter referred to also as units G2) based on a (meth)acrylate or α-halo acrylate (hereinafter collectively referred to also as a monomer G2) having a polyfluoroalkyl group. That is, the polymer (G) is preferably a fluorinated polymer containing units G2.

As the monomer G2, a compound represented by the formula $CH_2$=CR—C(O)O—Y—$(CF_2)_sF$ and a compound having R in said compound substituted by a halogen atom are preferred. In the formula, s is an integer of from 1 to 6, and Y is a $C_{1-10}$ alkylene group.

As —$(CF_2)_2F$, —$(CF_2)_4F$ and —$(CF_2)_6F$ are more preferred.

As Y, —$CH_2$—, —$CH_2CH_2$—, —$(CH_2)_{11}$— and —$CH_2CH_2CH(CH_3)$— are preferred, and —$CH_2CH_2$— is more preferred.

As the halogen atom at the α-position, a chlorine atom is preferred.

As the monomer G2, $CH_2$=CHC(O)O$C_2H_4(CF_2)_4F$, $CH_2$=CHC(O)O$C_2H_4(CF_2)_6F$, $CH_2$=C(CH_3)C(O)OC_2H_4(CF_2)_4F$, $CH_2$=C(CH_3)C(O)OC_2H_4(CF_2)_6F$, $CH_2$=CClC(O)OC_2H_4(CF_2)_4F$ and $CH_2$=CClC(O)OC_2H_4(CF_2)_6F$ are preferred. As the monomer G2, one type may be used alone, or two or more types may be used in combination.

The content of units G2 in the polymer G is, from such a viewpoint that the working mechanisms of the present invention will be more excellent, preferably from 20 to 75 mol %, particularly preferably from 30 to 65 mol %, to all units contained in the polymer G.

The polymer G preferably contains units based on a (meth)acrylate having a group represented by the formula —$NR^1R^2$ or formula —$N(O)R^3R^4$ or units based on an acrylamide (hereinafter both units will be collectively referred to also as "units G3").

Further, the above (meth)acrylate and (meth)acrylamide may be collectively referred to also as a "monomer G3".

In the formula, $R^1$, $R^2$, $R^3$ and $R^4$ each independently represent a benzyl group, a $C_{1-8}$ alkyl group or a $C_{2-3}$ hydroxyalkyl group.

The monomer G3 is preferably a compound represented by the formula $CH_2$=CR—C(=O)-M-Q-$NR^1R^2$ or formula $CH_2$=CR—C(=O)-M-Q-N(O)$R^3R^4$.

In the formula, M is —O— or —NH—.

Q is a single bond, a $C_{2-4}$ alkylene group, or a $C_{2-3}$ alkylene group having some of hydrogen atoms substituted by hydroxy groups.

As the monomer G3, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-diisopropylaminoethyl (meth)acrylate and N,N-dimethylaminopropyl (meth)acrylamide are preferred.

As the monomer G3, one type may be used alone, or two or more types may be used in combination.

The content of units G3 in the polymer G is, from such a viewpoint that the working mechanisms of the present invention will be more excellent, preferably from 1 to 30 mol %, more preferably from 5 to 25 mol %, to all units contained in the polymer.

The polymer G may also contain units (hereinafter referred to also as "units G4") based on a monomer (hereinafter referred to also as a "monomer G4") having a crosslinkable functional group capable of reacting with a hydroxy group or a carboxy group, and not having a polyfluoroalkyl group.

The monomer G4 is a monomer copolymerizable with a monomer G1, a monomer G2 and/or a monomer G3. Here, one which is included in the monomer G1 shall not be included in the monomer G4.

As said crosslinkable functional group, an isocyanate group, a blocked isocyanate group, a urethane bond, an alkoxysilyl group, an epoxy group, an N-methylol group and an N-alkoxy methyl group may be mentioned.

The monomer G4 is preferably a derivative of a (meth)acrylate or a derivative of a vinyl compound.

As the monomer G4, the following compounds G4-1 to G4-5 may preferably be mentioned.
<Compound G4-1 (Compound Having an Isocyanate Group)>
2-isocyanate ethyl (meth)acrylate
3-isocyanate propyl (meth)acrylate
4-isocyanate butyl (meth)acrylate
<Compound G4-2 (Compound Having a Blocked Isocyanate Group)>
2-butanone oxime adduct of 2-isocyanate ethyl (meth)acrylate pyrazole adduct of 2-isocyanate ethyl (meth)acrylate
3,5-dimethylpyrazole adduct of 2-isocyanate ethyl (meth)acrylate
3-methylpyrazole adduct of 2-isocyanate ethyl (meth)acrylate
ε-caprolactam adduct of 2-isocyanate ethyl (meth)acrylate
2-butanone oxime adduct of 3-isocyanate propyl (meth)acrylate
pyrazole adduct of 3-isocyanate propyl (meth)acrylate
3,5-dimethylpyrazole adduct of 3-isocyanate propyl (meth)acrylate
3-methylpyrazole adduct of 3-isocyanate propyl (meth)acrylate
ε-caprolactam adduct of 3-isocyanate propyl (meth)acrylate
2-butanone oxime adduct of 4-isocyanate butyl (meth)acrylate
pyrazole adduct of 4-isocyanate butyl (meth)acrylate
3,5-dimethylpyrazole adduct of 4-isocyanate butyl (meth)acrylate
3-methylpyrazole adduct of 4-isocyanate butyl (meth)acrylate
ε-caprolactam adduct of 4-isocyanate butyl (meth)acrylate
<Compound G4-3 (Compound Having an Alkoxysilyl Group)>
Compound represented by $CH_2=CR^6$-D-E-$SiR^7R^8R^9$ (wherein D is —OCO—, —COO— or a single bond, E is a $C_{1-4}$ alkylene group, $R^7$, $R^8$ and $R^9$ are each independently a $C_{1-6}$ alkyl group or a $C_{1-6}$ alkoxy group (provided that at least one of $R^7$, $R^8$ and $R^9$ is the alkoxy group), and $R^6$ is a hydrogen atom or a methyl group).

As specific examples, the following compounds may be mentioned.
3-methacryloyloxypropyl trimethoxysilane
3-methacryloyloxypropyl dimethoxymethylsilane
3-methacryloyloxypropyl triethoxysilane
3-methacryloyloxypropyl diethoxyethylsilane
vinyltrimethoxysilane
<Compound G4-4 (Compound Having an Epoxy Group)>
glycidyl (meth)acrylate
<Compound G4-5 (Compound Having an N-Methylol Group or an N-Alkoxymethyl Group)>
N-methylol (meth)acrylamide
N-methoxymethyl (meth)acrylamide
N-ethoxymethyl (meth)acrylamide
N-butoxymethyl (meth)acrylamide As the monomer G4, the above compound G4-2 is preferred, and a 3,5-dimethylpyrazole adduct of 2-isocyanatoethyl methacrylate is more preferred.

As the monomer G4, one type may be used alone, or two or more types may be used in combination.

The content of units G4 in the polymer G is, from such a viewpoint that the working mechanisms of the present invention will be more excellent, preferably from 0 to 25 mol %, more preferably from 1 to 10 mol %, to all units contained in the polymer G.

The polymer G preferably contains units (hereinafter referred to also as "units G5") based on a hydroxyalkyl (meth)acrylate (hereinafter referred to also as a "monomer G5") represented by the formula $CH_2=CR-C(=O)O-R^{10}-OH$. In the formula, $R^{10}$ is a $C_{1-12}$ alkyl group. Here, $R^{10}$ may be linear or may be branched.

The monomer G5 is a monomer copolymerizable with a monomer G1, a monomer G2, a monomer G3 and/or a monomer G4. As specific examples of the monomer G5, 2-hydroxyethyl (meth)acrylate, and 3-hydroxypropyl (meth)acrylate may be mentioned.

In a case where the polymer G contains units G5, the polymer G preferably further contains units G3. When the polymer G contains units G3 and units G5, the hydrophilicity of the polymer G will be suitably adjusted, and at the same time, groups of units G3 and groups of units G5 will be arranged at the surface layer of the coating film containing the polymer G, to provide excellent anti-biofouling properties.

In a case where the polymer G contains units G3 and units G5, to the content of units G3 contained in the polymer G, the ratio to the content of units G5 contained in the polymer G is preferably from 0.20 to 4.0, more preferably from 0.50 to 2.0.

The content of units G5 in the polymer G is, from such a viewpoint that the working mechanisms of the present invention will be more excellent, preferably from 1 to 35 mol %, more preferably from 10 to 30 mol %, to all units contained in the polymer G.

The polymer G may contain units (hereinafter referred to also as "units G6") other than units G1, units G2, units G3, units G4 and units G5. Units G6 are units based on a monomer (hereinafter referred to also as a "monomer G6") which is copolymerizable with a monomer G1, a monomer G2, a monomer G3, a monomer G4 and/or a monomer G5, and which is not included in any one of them.

As the monomer G6, a monomer having the above-mentioned non-hydrophilic polyoxyalkylene chain may be mentioned. As other monomers G6, the following monomers may be mentioned.

Ethylene, vinylidene chloride, vinyl chloride, vinyl acetate, vinyl propionate, vinyl isobutanoate, vinyl isodecanoate, vinyl stearate, cetyl vinyl ether, dodecyl vinyl ether, isobutyl vinyl ether, ethyl vinyl ether, 2-chloroethyl vinyl ether, styrene, α-methyl styrene, p-methyl styrene, diacetone (meth)acrylamide, methylolated diacetone (meth)acrylamide, vinyl alkyl ketone, butadiene, isoprene, chloroprene, benzyl (meth)acrylate, a (meth)acrylate having a polysiloxane chain, allyl acetate, N-vinyl carbazole, maleimide, N-methylmaleimide, (meth)acrylic acid, 2-ethylhexyl (meth)acrylate, stearyl (meth)acrylate, glycerin mono(meth)acrylate, an adduct of 2-hydroxyethyl (meth)acrylate and ε-caprolactone, propylene glycol diglycidyl ether di(meth)acrylate, tripropylene glycol diglycidyl ether di(meth)acrylate, glycerin diglycidyl ether di(meth)acrylate, etc. may be mentioned.

Among these, from the viewpoint of film forming properties and durability of the coating film, vinylidene chloride, vinyl chloride, vinyl acetate, vinyl propionate, glycerin diglycidyl ether di(meth)acrylate, behenyl (meth)acrylate, isobornyl (meth)acrylate and stearyl (meth)acrylate are preferred.

The content of units G6 in the polymer G is, from such a viewpoint that the working mechanisms of the present invention will be more excellent, preferably at most 20 mol %, more preferably at most 10 mol %, to all units contained in the polymer G.

The polymer G in the present invention may have an anionic group at the main chain terminal. In the present invention, the main chain of the polymer G means an atomic chain to be formed by addition polymerization of ethylenic double bonds of a monomer, or of double bonds of polymerizable unsaturated groups. The main chain is preferably a carbon atom chain (which may contain an etheric oxygen atom).

The anionic group in the present invention means a group capable of becoming an anion by being ionized in water, and is specifically preferably at least one type of acid group selected from the group consisting of a carboxy group, a sulfonic acid group, a phosphoric acid group, a chloric acid group, a nitric acid group and a manganic acid group, and among them, a carboxy group is more preferred. These acid groups may form salts or esters. Two or more types of anionic groups may be present in one molecule of the polymer G.

The fluorine content in the polymer G is preferably from 0 to 60 mass %, particularly preferably from 10 to 50 mass %.

The weight average molecular weight (Mw) of the polymer G is preferably from 5,000 to 150,000, particularly preferably from 10,000 to 100,000. When Mw is at least 5,000, the durability will be excellent, and when it is at most 150,000, the film forming property and liquid stability will be excellent. Mw of the polymer G is obtainable by measurement by gel permeation chromatography using polymethyl methacrylate as a standard substance.

In the coating material of the present invention, the polymer G may be in a state of a powder (solid), may be in a state of a solution dissolved in an organic solvent, or may be in a state of a dispersion (aqueous dispersion) dispersed in the form of particles in water, and is preferably in a state of an aqueous dispersion. The method of letting the polymer G be dispersed in the form of particles in water is not particularly limited, and it may be dispersed by a known dispersion method.

The average particle size of particles of the polymer G is, from the viewpoint of water-resistance of the present coating film, preferably at most 200 nm, more preferably at most 150 nm, particularly preferably at most 100 nm, further preferably at most 70 nm. The lower limit is usually 50 nm.

In the coating material of the present invention, to the total mass of the polymer F and the polymer G, the content of the polymer F is from 50 to 99 mass %, preferably from 75 to 95 mass %. Thus, the working mechanisms of the present invention will be expressed more.

In the coating material of the present invention, the fluorine content to the total mass of the polymer F and the polymer G is more preferably from 10 to 50 mass %. When the fluorine content is within the above range, the working mechanisms of the present invention will be expressed more.

The method for producing the coating material of the present invention is not particularly limited, and it may be prepared by mixing the polymer F and the polymer G. For example, it may be produced by mixing an aqueous dispersion containing the polymer F and an aqueous dispersion containing the polymer G.

As mentioned above, the form of the coating material of the present invention is preferably in a state of a dispersion where particles of the polymer F and particles of the polymer G are, respectively, dispersed in water. In other words, the coating material of the present invention preferably further contains water wherein the polymer F and the polymer G are, respectively, dispersed in the form of particles. Hereinafter, the coating material of the present invention in such a state will be referred to also as an "aqueous coating material of the present invention".

The content of water in the aqueous coating material of the present invention is preferably from 30 to 85 mass %, more preferably from 35 to 75 mass %, to the total mass of the aqueous coating material of the present invention.

As described above, the polymer F is preferably a polymer having crosslinkable groups such as hydroxy groups, and the polymer G is also preferably a polymer having hydroxy groups, and thus, it is preferred that at least one of the polymer F and the polymer G has hydroxy groups. In particular, it is particularly preferred that both the polymer F and the polymer G in the coating material of the present invention have hydroxy groups.

In a case where at least one of the polymer F and the polymer G in the coating material of the present invention is one having hydroxy groups, it is preferred that the coating material of the present invention contains a crosslinking agent having at least two reactive groups which react with hydroxy groups. As such a crosslinking agent, a compound having at least two isocyanate groups, blocked isocyanate groups, epoxy groups, etc., is preferred. Also in a case where the polymer G is a polymer containing units G4, it is possible to use a cross-linking agent having reactive groups different in the reaction temperature for the crosslinking reaction. In particular, in a case where the coating material of the present invention is an aqueous coating material, it preferably contains, as a crosslinking agent, a water-dispersible isocyanate curing agent (a cross-linking agent which is a blocked polyisocyanate having at least two blocked isocyanate groups and which can be dispersed in water).

In a case where the coating material of the present invention contains a crosslinking agent, the content of the crosslinking agent in the coating material is preferably from 0.1 to 30 mass %, more preferably from 1 to 20 mass %, particularly preferably from 5 to 15 mass %, to the total mass of the polymer F and the polymer G in the coating material.

The coating material of the present invention may, as the case requires, contain other additives (e.g. a fungicide, an anti-algae agent, a coalescing aid, a thickener, a defoamer, a light stabilizer, a design agent, a surface conditioner, etc.).

As mentioned above, the coating material of the present invention exhibits an antifungal or antialgal function by the polymer G itself, but from the viewpoint of further enhancing the effect, it may contain a fungicide or anti-algae agent.

As the fungicide or anti-algae agent, a known fungicide or anti-algae agent may be used, and from the viewpoint of compatibility with the polymer F and the polymer G, an agent containing, as an active ingredient, a compound containing a halogen atom, may be employed. Further, in the case of using the polymer F containing chlorine atoms (e.g. polymer F wherein the fluoroolefin is $CF_2=CFCl$), an agent containing, as an active ingredient, a compound containing a chlorine atom, bromine atom or iodine atom, may be employed.

The content of the fungicide or anti-algae agent in the coating material may, respectively, be preferably from 0.01 to 5 parts by mass, to the total mass of the polymer F and the polymer G in the coating material.

According to the present invention, a ship, marine structure or subsea structure is provided which has, on its surface, a coating film formed by using the coating material of the present invention. The coating material of the present invention is particularly suitable as an anti-biofouling coating material, to be applied to the surface to be in contact with seawater or under an environment to be contact with seawater, in a ship navigating the sea, in a marine structure or in an undersea structure.

As the coating object, the ship, marine structure or subsea structure is not particularly limited, so long as it is one to be used in marine, lake, river, and in the vicinity thereof, and may, for example, be a bridge, a fishing net, a wave consumption block, a breakwater, a submarine cable, a tank, a pipeline, a submarine drilling equipment, a float, an inlet or outlet of a power station, a water pipe of a power station (cooling water pipe), the hull of a ship (in particular, a ship bottom portion or draft unit), a screw of a ship, an anchor of a ship, etc. The material of the object is also not particularly limited, and may be any of metal, resin, rubber, stone, glass and concrete.

Further, the shape or state (contact state with water) of the object is also not particularly limited.

For example, even in the case of a seawater pipe (coolant piping) of a coastal power station being an object where there is a bent shape in the pipe shape, and the flow velocity and temperature of the seawater in the pipeline may substantially vary, by having, on the interior surface of the pipe, a coating film formed by using the coating material of the present invention, the marine anti-biofouling function and anti-corrosion properties will be exhibited over a long period of time.

The thickness of the coating film to be formed is preferably from 10 to 100 μm. When the thickness of the coating film is at least 10 μm, the salt water resistance of the coating film will be more excellent, and when it is at most 100 μm, the weather resistance of the coating film will be more excellent.

The present coating film may be formed on the outermost surface to be exposed to an aqueous environment, of the object. That is, the coating material of the present invention may be applied directly to the surface of the object, or it may be applied to the outermost surface via an undercoat layer or the like.

As the coating method of the coating material to the object, a method by using a coating apparatus such as a brush, a roller, dipping, a spray, a roll coater, a die coater, an applicator, a spin coater, etc. may be mentioned.

The ship, marine structure or subsea structure of the present invention has, on its surface, a coating film containing the polymer F as the main component, formed by using the coating material of the present invention. Therefore, not only sessile organisms are less likely to adhere over a long period of time, but also it is excellent in corrosion resistance, whereby it can be used over a long period of time. Further, in the coating film, a structure selected from a crosslinked structure wherein the polymers F are mutually crosslinked, a crosslinked structure wherein the polymer F and the polymer G are crosslinked, and a crosslinked structure wherein the polymers G are mutually crosslinked, may be contained, and a plurality of such structures may be contained.

As described above, in the present invention, it is also possible to provide a method for preventing adhesion of sessile organisms to a ship, marine structure or subsea structure, by forming a coating film of the coating material comprising the polymer F and the polymer G, to the surface of the ship, marine structure or subsea structure.

According to the present invention, an article to be used in a humid environment or wetted environment, which has, on its surface, the present coating film, is provided. Here, in this specification, the humid environment means an environment with a humidity of at least 40%, and the wetted environment means an environment constantly in contact with water or an environment from time to time in contact with water.

Specific examples of the article to be used in a humid environment or wetted environment, may be a tub, a ceiling panel, a wall panel, a floor pan, a door, a faucet, a drainage unit, a ventilator, a mirror, a sink, a toilet bowl, a low tank, an indoor plumbing product such as a wash unit, a water supply pipe, an underground structure such as a sewer pipe, and an outdoor structure such as a water tank or a building. Specific examples of the material for the above article, may be metal, resin, rubber, stone, glass and concrete.

The thickness of the coating film which the article has, is preferably from 10 to 100 μm. When the thickness of the coating film is at least 10 μm, the water resistance of the coating film will be more excellent, and when it is at most 100 μm, the weather resistance of the coating film will be more excellent.

The present coating film may be formed on the outermost surface of the article exposed to a humid environment or wetted environment. That is, the coating material of the present invention may be applied directly to the surface of the article, or it may be applied to the outermost surface via an undercoat layer or the like.

As the coating method of the coating material to the object, a method by using a coating apparatus such as a brush, a roller, dipping, a spray, a roll coater, a die coater, an applicator, a spin coater, etc., may be mentioned.

Further, even if the article on which the coating film is to be disposed, is an outer wall of a building located on a north or west side poor in sunshine, the inner face of a water tank, or an article in a light-shielded environment such as a clean water pipe, a sewer pipe, etc., by the working mechanisms of the present invention, the article having the coating film on its surface is excellent in antifungal or antialgal properties over a long period of time, and thus, has such a characteristic that its environmental load is low. Further, in the coating film, a structure to be selected from a crosslinked structure wherein the polymers F are mutually crosslinked, a crosslinked structure wherein the polymer F and the polymer G are crosslinked, and a crosslinked structure where the polymers G are mutually crosslinked, may be contained, and a plurality of such structures may be contained.

As described above, in the present invention, it is also possible to provide a method for preventing adhesion of fungi or algae to an article by forming a coating film of the coating material comprising the polymer F and the polymer G, on the surface of the article.

EXAMPLES

Hereinafter, the present invention will be described in detail with reference to Examples, but the present invention is not limited to these Examples. Further, the blend amounts of the respective components in Tables given later, are based on mass.

<Production of Polymer F>

CTFE: $CF_2$=CFCl

CM-EOVE: $CH_2$=CHOCH$_2$-cycloC$_6$H$_{10}$—CH$_2$—(OCH$_2$CH$_2$)$_{15}$OH (average molecular weight: 830, wherein -cycloC$_6$H$_{10}$— is a 1,4-cyclohexylene group)

CHVE: cyclohexyl vinyl ether

CHMVE: 4-hydroxymethyl-cyclohexylmethyl vinyl ether

EVE: ethyl vinyl ether

Nonionic surfactant: manufactured by Nippon Nyukazai Co., Ltd., Newcol-2320 (trade name)

Anionic surfactant: manufactured by Nikko Chemicals Co., Ltd., sodium lauryl sulfate.

[Preparation Example 1] Production Method for Polymer $F^1$

Into a vacuum degassed autoclave, CTFE (434 g), CHVE (259 g), EVE (107 g), CM-EOVE (124 g), ion-exchanged water (1,031 g), potassium carbonate (2.1 g), ammonium persulfate (1.0 g) and the anionic surfactant (2.1 g) were charged, and the polymerization reaction was carried out at 60° C. for 24 hours under stirring. After the polymerization reaction, the reaction solution was cooled from 60° C. to 20° C. to obtain an aqueous dispersion containing the polymer F (fluorinated polymer concentration: 49.7 mass %). The obtained polymer will be hereinafter referred to as "polymer $F^1$".

In the polymer $F^1$, the contents of units based on CTFE, units based on CM-EOVE, units based on CHVE and units based on EVE are, in this order, 50 mol %, 2.0 mol %, 28 mol % and 20 mol %. Here, in the aqueous dispersion, the polymer $F^1$ was dispersed in a particle form, and the average particle size in water was 80 nm.

[Preparation Example 2] Production Method for Polymer $F^2$

Into a vacuum degassed autoclave, CTFE (664 g), ion-exchanged water (1,280 g), EVE (185 g), CHVE (244 g), CM-EOVE (47 g), CHMVE (194 g), potassium carbonate (2.0 g), ammonium persulfate (1.3 g), the nonionic surfactant (33 g) and the anionic surfactant (1.4 g) were charged, and the polymerization reaction was carried out at 50° C. for 24 hours under stirring. After the polymerization reaction, the reaction solution was cooled from 50° C. to 20° C. to obtain an aqueous dispersion containing the polymer F (fluorinated polymer concentration: 50 mass %). The obtained polymer will be hereinafter referred to as "polymer $F^2$".

In the polymer $F^2$, the contents of units based on CTFE, units based on CM-EOVE, units based on CHVE, units based on CHMVE and units based on EVE were 50 mol %, 0.5 mol %, 17 mol %, 10 mol % and 22.5 mol %. Here, in the dispersion, the polymer $F^2$ was dispersed in a particle form, and the average particle size in water was 140 nm.

The compositions of the polymers $F^1$ and $F^2$ are shown in Table 1.

TABLE 1

| Type of polymer F | | $F^1$ | $F^2$ |
|---|---|---|---|
| Composition of polymer F | CTFE (mol %) | 50 | 50 |
| | CHVE (mol %) | 28 | 17 |
| | EVE (mol %) | 20 | 22.5 |
| | CHMVE (mol %) | 0 | 10 |
| | CM-EOVE (mol %) | 2 | 0.5 |

<Production of Polymer G>

In the production of the polymer G, the following raw materials were employed.
C6FMA: $CH_2$=$C(CH_3)C(O)OC_2H_4C_6F_{13}$
VCM: vinyl chloride
STA: stearyl acrylate
PE350: polyethylene glycol monomethacrylate (manufactured by NOF Corporation, trade name: BLEMMER PE350, number of polyoxyethylene groups=8)

PME400: polyethylene glycol monomethacrylate (manufactured by NOF Corporation, trade name: BLEMMER PME400, number of oxyethylene groups=9)
70PET-350B: poly(oxyethylene-oxypropylene)diol monomethacrylate (manufactured by NOF Corporation, trade name: BLEMMER 70PET-350B, number of oxyethylene groups=5, number of oxypropylene groups=2)
PDE-150: triethylene glycol dimethacrylate (manufactured by NOF Corporation, trade name: BLEMMER PDE-150)
HEMA: 2-hydroxyethyl methacrylate
D-BI: 3,5-dimethyl pyrazole adduct of 2-isocyanatoethyl methacrylate (compound represented by the following formula (5))
DMAEMA: N,N-dimethylam inoethyl methacrylate
PEO-30 (surfactant): 10 mass % aqueous solution of polyoxyethylene oleyl ether (number of oxyethylene groups=about 26)
EPO-40 (surfactant): 10 mass % aqueous solution of poly(oxyethylene-oxypropylene) diol (oxyethylene group content=about 40 mass %)
ATMAC (surfactant): 10 mass % aqueous solution of monostearyl trimethyl ammonium chloride
VA-061A (polymerization initiator): 10 mass % aqueous solution of an acetate of 2,2'-azobis [2-(2-imidazolin-2-yl) propane] (manufactured by Wako Pure Chemical Industries, Ltd., VA-061)
DAIB (polymerization initiator): dimethyl-2,2'-azobisisobutyrate (manufactured by Wako Pure Chemical Industries, Ltd.)
DoSH (molecular weight modifier): n-dodecyl mercaptan
DPG (solvent) dipropylene glycol
Water: ion-exchanged water

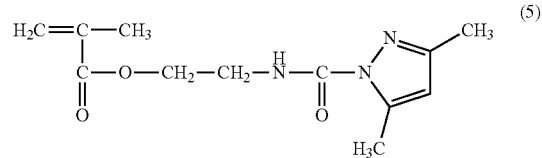 [SMILES: C=C(C)C(=O)OCCNC(=O)n1nc(C)cc1C]

[Preparation Example 3] Production Method for Polymers $G^1$ to $G^4$

Into a 1 L glass container, C6FMA (purity: 99.6%) (68.4 g), PE350 (41.3 g), DMAEMA (4.6 g), D-BI (4.8 g), acetone (356.4 g) and DAIB (0.95 g) were charged, and the polymerization was conducted at 65° C. for 20 hours at a stirring rotation speed of 350 rpm, to obtain a polymer solution (pale yellow, polymer concentration: 25.1 mass %, Mw of polymer: 60,000). The obtained polymer will be hereinafter referred to as "polymer $G^1$".

Next, to the obtained solution (50 g) of the polymer $G^1$, water (45 g) and acetic acid (1.1 g) were added and stirred for 15 minutes. Under a reduced pressure condition, acetone was removed at 65° C., and the concentration was adjusted by ion-exchanged water to obtain an aqueous dispersion having the polymer $G^1$ dispersed in a particle form (clear pale yellow, polymer concentration: 20 mass %).

Further, polymers $G^2$ to $G^4$ were obtained in the same manner as in Preparation Example 3, except that the components shown in Table 2 given below, were used.

[Preparation Example 4] Production of Polymers H¹ and H²

Into a 1 L glass container, C6FMA (89.3 g), HEMA (15.7 g), D-BI (4.8 g), PEO-30 (30.2 g), EPO-40 (6.0 g), ATMAC (6.0 g), water (144.4 g), DPG (36.2 g) and DoSH (1.2 g) were introduced, warmed at 60° C. for 30 minutes and then mixed by using a homomixer to obtain a mixed solution.

The obtained mixed solution was treated with 40 MPa by using a high pressure emulsifier while being kept at 60° C., to obtain an emulsion. 300 g of the obtained emulsion was put into a stainless steel reaction vessel and cooled to 40° C. VA-061A (5.2 g) was added, the gas phase was replaced with nitrogen, then VCM (9.3 g) was introduced, followed by a polymerization reaction at 60° C. for 15 hours with stirring, and further the concentration was adjusted with ion-exchanged water to obtain an aqueous dispersion having a polymer dispersed in a particle form (solid content concentration: 20 mass %). The obtained polymer will be hereinafter referred to as "polymer H¹"

Further, polymer H² was obtained in the same manner as in Preparation Example 4, except that the components shown in Table 2 given below, were used.

Compositions of polymers G¹ to G⁴ and polymers H¹ and H² are shown in the following Table 2.

<Anti-Biofouling Property Evaluation 1>

A test plate was prepared by the following procedure.

On both sides of an aluminum substrate, an epoxy resin type coating material (manufactured by Chugoku Marine Paints, Ltd., a coating material obtained by mixing product name "SEAJET 013 main agent" and product name "SEAJET 013 curing agent" in a mass ratio of 4:1), was applied by a brush so that the film thickness of dried coating film would be about 60 μm and cured at room temperature for one week. Next, on one surface of the aluminum substrate, the anti-biofouling coating material 1 was applied by an applicator so that the film thickness of the dried coating film would be about 30 μm, followed by drying at room temperature for 2 weeks, to prepare a test plate 1 having a coating film containing the polymer F¹ and the polymer G¹ as constituents, on the surface. In the same manner, with respect to biofouling coating materials 2 to 9, test plates 2 to 9 were prepared.

Each of the obtained test plates 1 to 9 was immersed in sea (depth 1 m), and the state of adhesion of barnacles and shellfish after 4 months was visually observed. Here, the place for immersion in sea was Seto Inland, and at the time of immersion in sea, each test plate was set so that coating film side faced south.

TABLE 2

| Type of polymer G | | | G¹ | G² | G³ | G⁴ | H¹ | H² |
|---|---|---|---|---|---|---|---|---|
| Composition of polymer G | Monomer G1 | PE350 (mol %) | 31.4 | | | | | |
| | | PME400 (mol %) | | | 28.8 | | | |
| | | 70PET-350B (mol %) | | | | 32.2 | | |
| | | PDE-150 (mol %) | | 0.9 | | | | |
| | Monomer G2 | C6FMA (mol %) | 52.7 | 53.4 | 54.7 | 52.1 | 41.8 | 49 |
| | Monomer G3 | DMAEMA (mol %) | 9.8 | 19.7 | 10.1 | 9.6 | | |
| | Monomer G4 | D-BI (mol %) | 6.1 | | 6.4 | 6.1 | 3.7 | 4.4 |
| | Monomer G5 | HEMA (mol %) | | 26 | | | 24.4 | |
| | Monomer G6 | VCM (mol %) | | | | | 30.1 | 35.2 |
| | | STA (mol %) | | | | | | 11.4 |

<Production of Anti-Biofouling Coating Material>

Production Example 1

To the aqueous dispersion containing the polymer F¹ (solid content concentration: 49.7 mass %) (100.0 g), a coalescent 2,2,4-trimethyl-1,3-pentanediol mono(2-methyl propanate) (7.5 g), RHEOLATE 288 (trade name) (manufactured by Elementis Japan) (0.1 g) being a thickener, a water-dispersible isocyanate curing agent (manufactured by Sumika Bayer, Bayhydur 3100 (trade name)) (5.4 g) being a crosslinking agent and an aqueous dispersion containing the polymer G¹ (solid content concentration: 20.0 mass %) (24.0 g) were added and thoroughly mixed to obtain an anti-biofouling coating material 1.

Further, anti-biofouling coating materials 2 to 9 were obtained in the same manner as in Production Example 1, except that the components shown in Table 3 given below, were used. In Table 3 given below, "FMA-12" is an aqueous dispersion containing a vinylidene fluoride polymer and a (meth)acrylic polymer (manufactured by Arkema Inc., product name "Kynar Aquatec FMA-12").

The evaluation standards were as follows, and the results of anti-biofouling property evaluation 1 (seawater immersion test) are shown in Table 3.

SS: There was no adhesion of barnacles or shellfish to the surface of the coating film.

S: Adhesion of barnacles or shellfish was observed at an area of more than 0% and at most 10% of the coating film surface.

A: Adhesion of barnacles or shellfish was observed at an area of more than 10% and at most 20% of the coating film surface.

B: Adhesion of barnacles or shellfish was observed at an area of more than 20% and at most 50% of the coating film surface.

C: Adhesion of barnacles or shellfish was observed at an area of more than 50% of the coating film surface.

<Anti-Biofouling Property Evaluation 2>

With respect to the test plates 1 to 9 prepared in the anti-biofouling evaluation 1, occurrence of algae to the coating film surface was confirmed by an agar method in accordance with JIS Z2911. The types of algae used were genus *Chlorella* and genus *Oscillatoria*. The evaluation standards were as follows, and the results of the anti-biofouling evaluation 2 (algae generation test) are shown in Table 3.

S: There was no adhesion of algae to the coating film surface.

A: Adhesion of algae was observed at an area of more than 0% and at most 10% of the coating film surface.

B: Adhesion of algae was observed at an area of more than 10% and at most 30% of the coating film surface.

C: Adhesion of algae was observed at an area of more than 30%.

<Adhesiveness>

With respect to the test plates 1 to 9 prepared in the anti-biofouling property evaluation 1, the salt spray test of JIS K5600-7-1 (1999) was conducted for 1,000 hours, and then, in accordance with JIS K5600-5-6 (1999), the adhesiveness of the coating film was evaluated. The evaluation standards were as follows, and the results are shown in Table 3. Here, "A and/or B" indicates that either "A and B" or "A or B" applies.

Class 0: Cut edges are completely smooth, and there is no peeling at the cross-cut portion.

Class 1: Slight peeling of the coating film is observed at an intersection of cuts. The cross-cut portion affected clearly does not exceed 5%.

Class 2: The coating film is peeled along edges and/or intersection of cuts. The cross-cut portion affected clearly exceeds 5% but does not exceed 15%.

Class 3: The coating film is partially or entirely substantially peeled along edges of cuts, and/or various portions of cross-cuts are partially or entirely peeled. The cross-cut portion affected clearly exceeds 15%, but does not exceed 35%.

Class 4: The coating film is partially or entirely substantially peeled along edges of cuts, and/or cross-cuts at several places are partially or entirely peeled. The cross-cut portion affected clearly does not exceed 35%.

Class 5: any of peeling that cannot be classified even in class 4.

The results of the above evaluation tests are shown in Table 3 given below. Here, Ex. 1 to 5 are Examples of the present invention, and Ex. 6 to 9 are Comparative Examples.

As shown by the evaluation results in Table 3, it was found possible to form a coating film excellent in the anti-biofouling properties and adhesiveness by using a coating material comprising the polymer F and the polymer G.

In contrast, since the polymers $H^1$ and $H^2$ contained in the coating materials in Ex. 6 and 7 had no units G1, the obtainable coating films were found to be poor in the anti-biofouling properties.

Further, since the coating material in Ex. 8 did not contain the polymer G, the obtainable coating film was found to be poor in the anti-biofouling properties.

Since the coating material in Ex. 9 did not contain the polymer F, the obtainable coating film was found to be poor in the adhesiveness. Further, since the coating film obtainable by the coating material in Ex. 9 had peeled from the aluminum substrate at the time of the evaluation test of the anti-biofouling properties, it was impossible to carry out the evaluation of the anti-biofouling properties in Ex. 9.

This application is a continuation of PCT Application No. PCT/JP2017/031973, filed on Sep. 5, 2017, which is based upon and claims the benefit of priority from Japanese Patent Application No. 2016-173989 filed on Sep. 6, 2016. The contents of those applications are incorporated herein by reference in their entireties.

What is claimed is:

1. A ship, seawater pipe, or subsea structure comprising a coating film formed by using an anti-biofouling coating material, which comprises:
   a polymer F being a fluorinated polymer containing units based on a fluoroolefin; and
   a polymer G being a polymer containing units based on a (meth)acrylate having a hydrophilic polyoxyalkylene chain,
   wherein the coating film of the anti-biofouling material is formed on the surface of the ship, seawater pipe, or subsea structure.

2. The ship, seawater pipe, or subsea structure according to claim 1, wherein the polymer F further contains units based on a monomer having a hydrophilic polyoxyalkylene chain.

TABLE 3

| | Table 3 | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| | Type of anti-biofouling coating material | | 1 | 2 | 3 | 4 | 5 | 6 | 7 | 8 | 9 |
| Composition of anti-biofouling coating material | Polymer F (g) | $F^1$ | 49.7 | 49.7 | 49.7 | 49.7 | | 49.7 | 49.7 | 49.7 | |
| | | $F^2$ | | | | | 50 | | | | |
| | Polymer G, H (g) | $G^1$ | 4.8 | | | | 4.8 | | | | 54.5 |
| | | $G^2$ | | 4.8 | | | | | | | |
| | | $G^3$ | | | 4.8 | | | | | | |
| | | $G^4$ | | | | 4.8 | | | | | |
| | | $H^1$ | | | | | | 4.8 | | | |
| | | $H^2$ | | | | | | | 4.8 | | |
| | FMA-12 (g) | | | | | | | | | 4.8 | |
| | Coalescing aid (g) | | 7.5 | 7.5 | 7.5 | 7.5 | 7.5 | 7.5 | 7.5 | 7.5 | 7.5 |
| | Thickener (g) | | 0.1 | 0.1 | 0.1 | 0.1 | 0.1 | 0.1 | 0.1 | 0.1 | 0.1 |
| | Crosslinking agent (g) | | 5.4 | 5.4 | 5.4 | 5.4 | 5.4 | 5.4 | 5.4 | 5.4 | 5.4 |
| Evaluation results | Anti-biofouling property evaluation test 1 (seawater immersion test) | | S | SS | S | S | A | B | C | C | Coating film peeled. Evaluation was impossible. |
| | Anti-biofouling property evaluation test 2 (algae generation test) | | S | S | S | S | A | B | C | C | Coating film peeled. Evaluation was impossible. |
| | Adhesiveness | | Class 0 | Class 0 | Class 0 | Class 0 | Class 1 | Class 2 | Class 3 | Class 3 | Class 5 |

3. The ship, seawater pipe, or subsea structure according to claim 1, wherein the polymer G further contains units based on a (meth)acrylate or α-haloacrylate having a polyfluoroalkyl group.

4. The ship, seawater pipe, or subsea structure according to claim 1, wherein the polymer G further contains units based on a (meth)acrylate having a group represented by the formula —$NR^1R^2$ or formula —$N(O)R^3R^4$ (wherein $R^1$, $R^2$, $R^3$ and $R^4$ are each independently a benzyl group, a $C_{1-8}$ alkyl group or a $C_{2-3}$ hydroxyalkyl group) or units based on a (meth)acrylamide.

5. The ship, seawater pipe, or subsea structure according to claim 1, wherein the polymer G further contains units based on a hydroxyalkyl (meth)acrylate having a $C_{1-12}$ hydroxyalkyl group.

6. The ship, seawater pipe, or subsea structure according to claim 1, which further contains water, and wherein the polymer F and the polymer G are, respectively, dispersed in the form of particles.

7. The ship, seawater pipe, or subsea structure according to claim 1, wherein to the total mass of the polymer F and the polymer G, the content of the polymer F is from 50 to 99 mass %.

8. The ship, seawater pipe, or subsea structure according to claim 1, wherein the anti-biofouling coating material is a marine anti-biofouling coating material applied to the surface of the ship, seawater pipe, or subsea structure, to prevent adhesion of marine organisms.

9. The ship, seawater pipe, or subsea structure according to claim 1, to prevent adhesion of fungi or algae.

10. The ship, seawater pipe, or subsea structure according to claim 1, wherein the anti-biofouling coating material further contains a fungicide or anti-algae agent.

11. A method for preventing adhesion of organisms on the surface of a ship, seawater pipe, or subsea structure, which comprises forming on the surface of the ship, seawater pipe, or subsea structure, a coating film of the anti-biofouling coating material, which comprises:
    a polymer F being a fluorinated polymer containing units based on a fluoroolefin, and
    a polymer G being a polymer containing units based on a (meth)acrylate having a hydrophilic polyoxyalkylene chain.

12. The method of claim 11, wherein the organism is selected from the group consisting of fungi and algae.

* * * * *